United States Patent
Annan

(10) Patent No.: US 6,189,947 B1
(45) Date of Patent: Feb. 20, 2001

(54) SUN VISOR EXTENSION DEVICE

(76) Inventor: Bennett Annan, 14221 Sylvan St., #6, Van Nuys, CA (US) 91401

( * ) Notice: Under 35 U.S.C. 154(b), the term of this patent shall be extended for 0 days.

(21) Appl. No.: 09/336,924

(22) Filed: Jun. 21, 1999

(51) Int. Cl.$^7$ .................................................. B60J 3/02
(52) U.S. Cl. ................. 296/97.12; 296/97.6; 296/97.8; 296/97.11; 296/97.13
(58) Field of Search .................. 296/97.6, 97.8, 296/97.12, 97.13, 97.11

(56) References Cited

U.S. PATENT DOCUMENTS

| | | | | |
|---|---|---|---|---|
| 4,792,176 | * | 12/1988 | Karford | 296/97.6 |
| 5,156,434 | * | 10/1992 | Vandagriff | 296/97.8 |
| 5,259,657 | * | 11/1993 | Arendt et al. | 296/97.6 |
| 5,306,065 | * | 4/1994 | Ades | 296/97.6 |
| 5,445,427 | * | 8/1995 | Vandagriff | 296/97.6 |
| 5,466,029 | * | 11/1995 | Zetterlund | 296/97.8 |
| 5,580,117 | * | 12/1996 | Goclowski | 296/97.6 |
| 5,626,381 | * | 5/1997 | Gervasoni et al. | 296/97.8 |

* cited by examiner

*Primary Examiner*—D. Glenn Dayoan
*Assistant Examiner*—Greg Blankenship

(57) ABSTRACT

A device is provided to provide extended sun protection offered by sun visors commonly used in motor vehicles, wherein the apparatus is removably attached to the vehicle sun visor and a panel of the device can be opened to provide protection from sun's rays shining through the vehicle from the side. In this manner, the vehicle's own sun visor can be lowered to offer frontal sun protection and the device of the invention offers sun protection from the side. In addition, the device of the invention is equipped with another panel that can be extended to provide protection from the sun's rays in the corner space between the front and the side of the vehicle.

3 Claims, 3 Drawing Sheets

SUN VISOR EXTENSION DEVICE

BACKGROUND OF THE INVENTION

This invention generally relates to sun visors, and particularly to sun visors used to provide protection from direct sun light in motor vehicles, such as cars, trucks, vans, RV's, and boats. More specifically, the device of this invention addresses the need for extending the protection from sun's rays that is offered by conventional sun visors so that the vehicle occupant is simultaneously offered protection from sun's rays shining through the vehicle from the front, side and corner directions without the need to move the conventional sun visor between the front and side directions.

Practically all motor vehicles sold on the market are equipped with one or more sun visors, typically one for the driver and one for the front passenger, to block and prevent direct sunlight or the sun's glare from shining into their eyes, especially during the early morning and pre-dusk hours when the sign shines at a low angle of trajectory. Such conventional sun visors typically have a generally flat, rectangular shaped panel that is designed to be in the up/closed position when not in use, and lowered when it is desired to block the sun's rays shining from the front of the vehicle. In addition, as the vehicle changes direction, the driver and passengers often find the sun shining through the left or the right sides of the vehicle, and in such situations, conventional sun visors can be swung to the side to provide side blockage. However, one drawback of conventional sun visors is that at any given time, they allow for sun protection only from one direction; i.e., either from the front or from the side. This requires the vehicle occupant to repeatedly swing the conventional sun visor from front to side and then back again, depending on the direction of vehicle travel relative to the sun's location. Not only is this an annoying task, having to constantly move the sun visor can be dangerous, because it takes away from the driver's focus and attention from his most important task, which is operating the motor vehicle. Another drawback of conventional sun visors is that they generally either provide frontal or side protection from sun's rays, leaving the corner space without coverage.

The present invention satisfies these needs by providing a sun visor extension device that is removably attachable to the conventional vehicle sun visor, and upon lowering of the sun visor to provide frontal sun protection, the device of the invention has a panel that can be opened to provide blockage of the sun from the side and another moveable panel that can provide sun protection from the corner direction. Accordingly, the sun visor extension device of the invention provides maximum coverage from the sun's direct light and indirect glare, while avoiding the necessity and annoyance of having to move the sun visor between the front and the side, and in doing so, reduces a source of danger in operating motor vehicles.

SUMMARY OF THE INVENTION

In accordance with the invention, a sun visor extension device has a first panel or member that is removably attached to a conventional, pre-existing vehicle sun visor, such that the first panel is positioned adjacent to and substantially flat against the inside surface of the vehicle's sun visor. A second panel connected to the first panel is provided such that, if desired, it can be moved along the length of the first panel to provide sun protection in the corner space between the front and the side positions of the sun visor. A third panel is provided such that when the conventional sun visor is lowered, the third panel is moveable from a closed position adjacent the first panel and the conventional sun visor to an open position to the side and away therefrom to provide side protection from the sun.

In the preferred form, a first generally flat and rectangular shaped panel is provided with a pair of flexible clips that allow the device to be mounted over one edge of the conventional sun visor. A second generally flat and rectangular shaped panel is joined with the first panel such that, if desired, it can slide out along the length of the first panel to provide sun protection in the corner space between the front and side positions of the sun visor. A third generally flat panel with a rounded end is connected to the second panel by a ball and socket connection such that the third panel can be easily moved between a closed position against the first panel and a desired open position to the side and away from the first panel. In an alternative form of the invention, the second side panel is eliminated and the third panel is connected directly to the first panel by a ball and socket.

With this construction, the sun visor extension device of the invention enables the user to utilize the conventional vehicle sun visor to provide frontal sun protection and the device of the invention to provide simultaneous side protection and, if desired, corner protection, from the sun, without the need to move the sun visor between the front and side positions.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF ALTERNATIVE EMBODIMENTS

Figure 1:
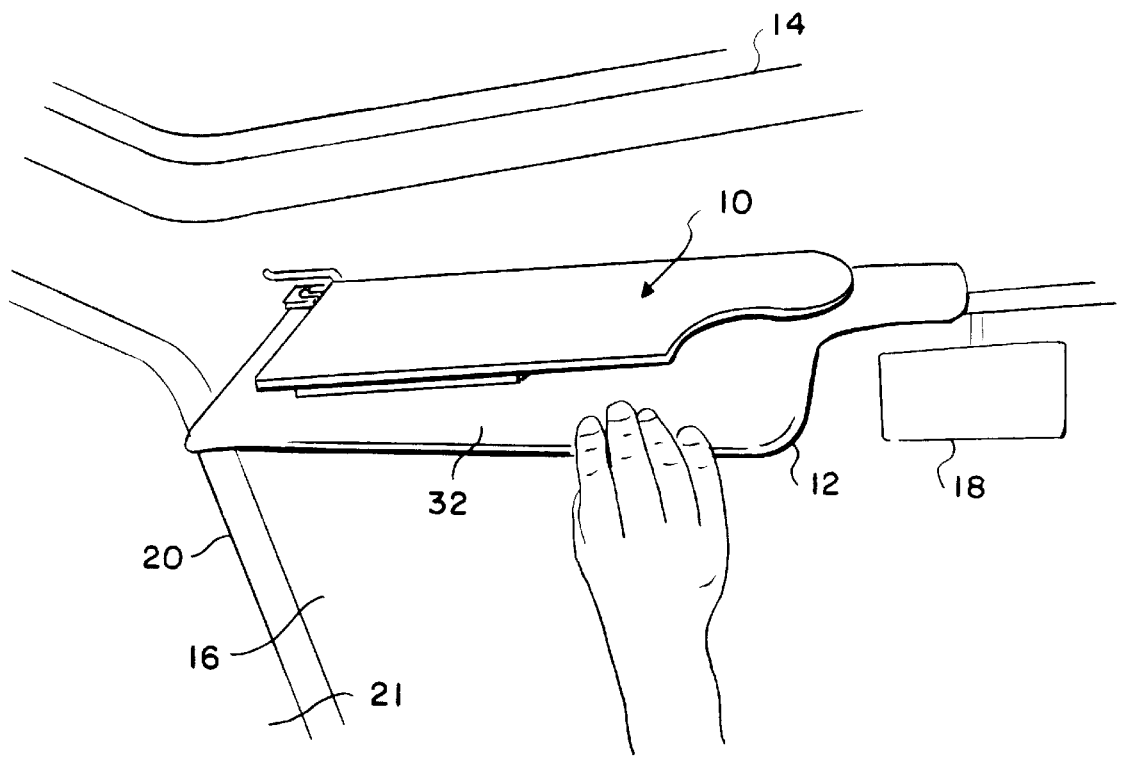
FIG. 1 is a perspective view illustrating a sun visor extension device embodying the novel features of the invention, with the device attached to a conventional pre-existing sun visor in a motor vehicle, the device shown in a closed position.
Figure 2:
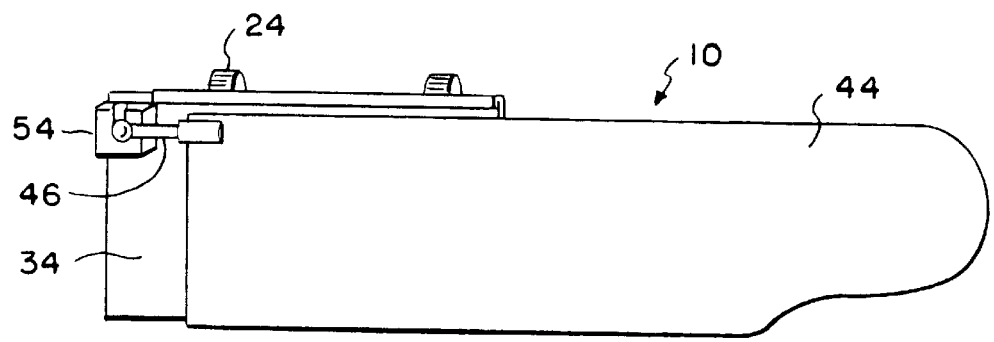
FIG. 2 is a front perspective view of the sun visor extension device of FIG. 1, with the device shown in isolation.
Figure 3:
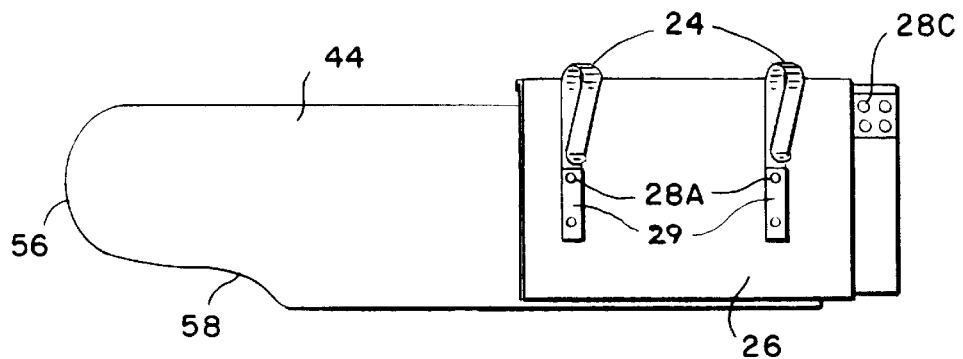
FIG. 3 is a rear perspective view of the sun visor extension device of FIG. 1.
Figure 4:
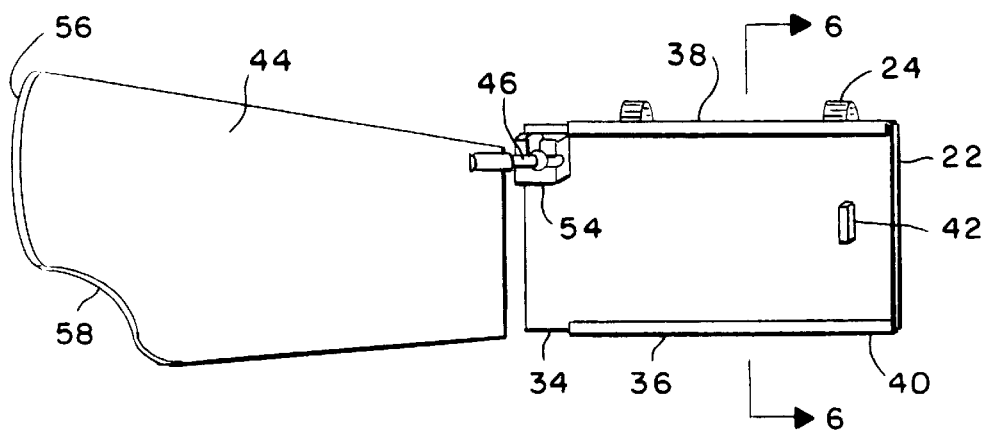
FIG. 4 is a front perspective view of the sun visor extension device shown in FIG. 2, but with a side panel of the device shown in an open position.
Figure 5:
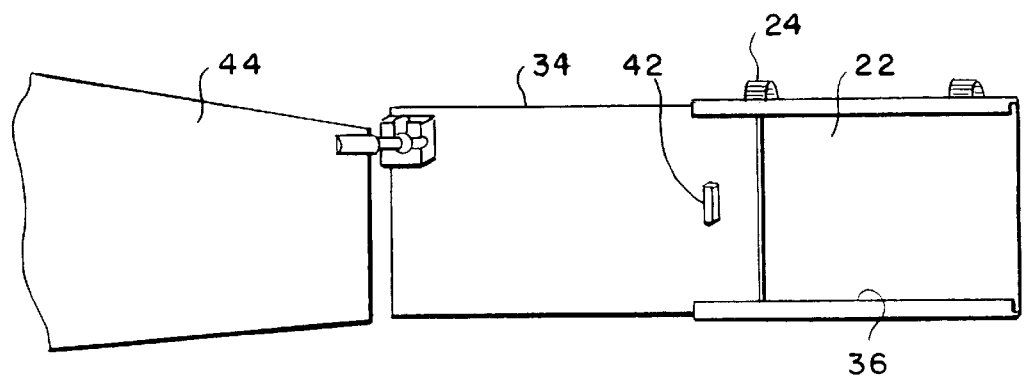
FIG. 5 is a front perspective view of the sun visor extension device similar to FIG. 4, but with a corner panel of the device shown in an extended position.
Figure 6:
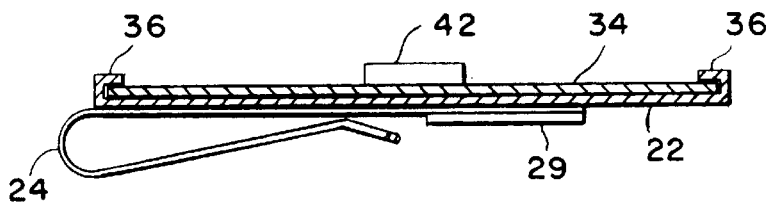
FIG. 6 is a cross sectional view of the sun visor extension device taken along line 6—6 of FIG. 4.
Figure 7:
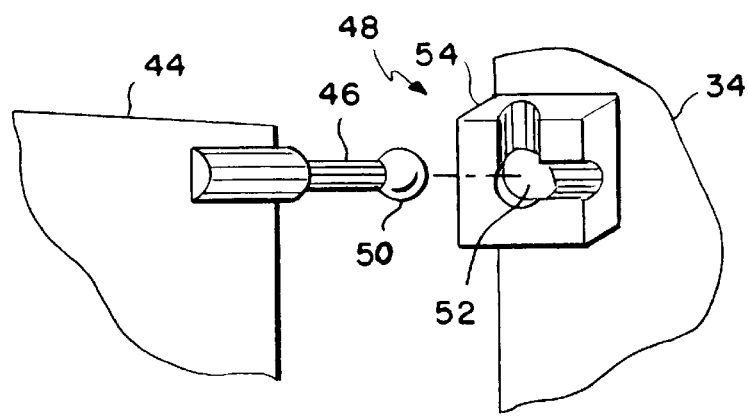
FIG. 7 is a perspective view of a portion of the sun visor extension device shown in FIG. 2, but showing an enlarged exploded view of the connection between the side panel and the corner panel of the device.

As shown in exemplary drawings, a sun visor extension device referred to generally by the reference numeral 10 is provided to extend the protection from sunlight offered by a conventional sun visor 12 that is pre-installed in a motor vehicle 14, a portion of which is shown in outline form with a windshield 16, a rear view mirror 18, a door/side window frame 20, and a side window 21.

In its preferred embodiment, the device of the invention has a first panel member 22, which is generally flat and rectangular shaped, and is sized to have a smaller surface area than the conventional vehicle sun visor 12. As such, when the pre-installed sun visor is in the up/closed position, the visor extension of the invention will not create an eye sore and remains hidden from view. A pair of flexible clips 24 are attached to the back side 26 of the first panel 22, each with a pair of short flat head screws 28A threaded through a support bracket 29. When the conventional sun visor is lowered, the flexible clips 24 can easily slide over the upper edge 30 thereof to allow the first panel to connect to, remain fixed and lay flat against the inside surface 32 of the conventional sun visor 12. Similarly, when use of the sun visor extension device 10 is not desired, the flexible clips 24 allow the user to remove the device and separate it from the conventional sun visor.

A second generally flat and rectangular panel 34 which provides sun protection in the upper corner of the vehicle between the front windshield 16 and the side window 21 is moveably connected to the first panel 22. As illustrated, the preferred connection between the second corner panel and the first panel is by way of a track formed by a pair of channel guides 36 along the upper edge 38 and the lower edge 40 of the first panel 12 such that the second panel 34 can mate with and slide back and forth sideways inside the channel guides 36. The second corner panel is provided with a raised handle 42, connected thereto with a pair of flathead screws (not shown), that allows the user to move the second panel sideways inside the channel guides 36.

A third flat and generally rectangular shaped panel 44 is provided to offer added protection from the sun light shining through the side of the vehicle. A short swing rod 46 is connected to an upper corner of the third side panel 44 by a pair of short screws or rivets (not shown). The rod 46 is connected through a ball and socket joint assembly 48 to the second panel 34, thereby permitting the third panel 44 to swing open to the side and away from the second panel. More specifically, the ball portion 50 of the assembly 48 is located at the end of the rod 46, and the socket portion 52 of the assembly is housed in a socket bracket 54, with the socket bracket connected to an upper corner of the second panel by four flathead screws 28C. With this construction, the third side panel 44 can be moved to one of a plurality of positions ranging from being closed and laying adjacent the first panel to more than ninety degrees away and to the side thereof to provide side protection from the sun shining through the side window 21 of the vehicle. The third panel 44 has a generally rounded end 56 to increase safety and avoid injury to the vehicle occupant who may unintentionally come into contact with the third panel in its open side position. The end of the third side panel also has a curved cut-out portion 58 and is preferably made of a transparent but tinted/smoked material to enhance visibility and avoid blocking the occupant's view through the side window of the vehicle.

Figure 8:
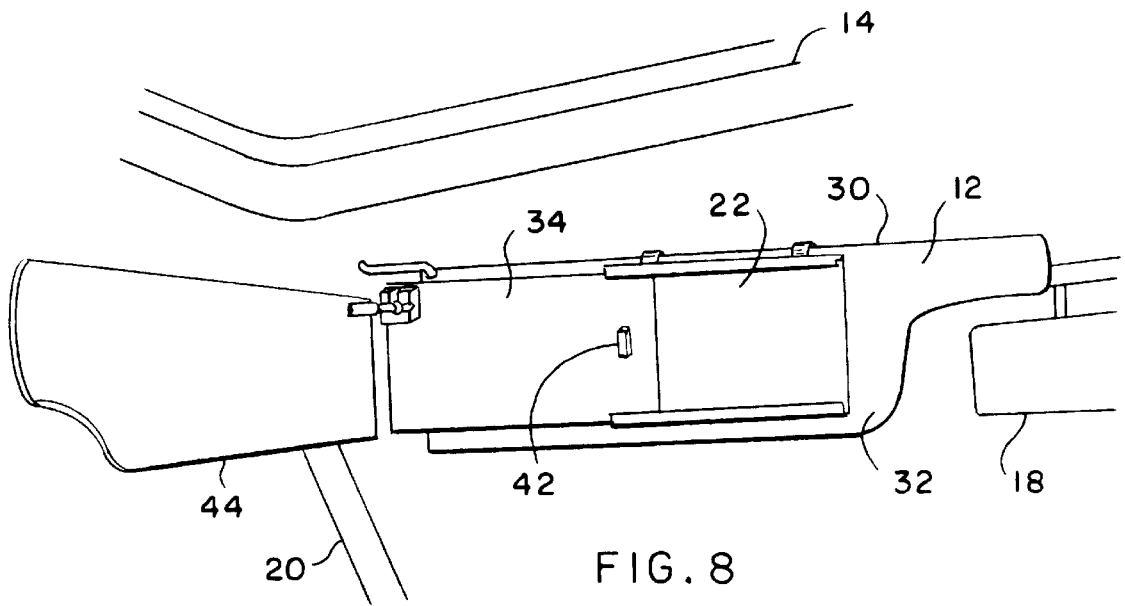
FIG. 8 is a front perspective view of the sun visor extension device of FIG. 1, but with the device shown in the open position.

In an alternative embodiment (not shown), the second panel can be eliminated, and the third/side panel can be directly connected to the first panel by way of the same type of ball and socket connection. In this embodiment, the clips of the first panel are secured around the upper edge of the conventional sun visor closer to the side of the vehicle than the positions shown in FIG. 8, and there will not be a need for a second panel to first slide towards the side window of the vehicle before opening the third/side panel to provide protection from the sunlight shining through the side of the vehicle.

The first panel, second panel and third panel of the invention are preferably made of plastic with an approximate thickness of 0.09 to 0.10 inches. However, it is understood that these specific materials and thicknesses are not crucial to the operation of the device, and other thicknesses or other materials can also be used.

The sun visor extension device of the invention thus provides a versatile, yet relatively simple device for extending the range and coverage of conventional vehicle sun visors, while also eliminating the need for moving the visor from one side to another, and in so doing, helps the operator of the vehicle avoid loss of concentration in operating the vehicle that results from having to move the conventional sun visor between the front and side positions to achieve optimum blockage of sunlight.

A variety of further modifications and improvements in and to sun visor extension device of the invention will be apparent to persons skilled in the art. By way of example, other alternative connections between the second and third panel, such as a hinged connection, can also be used. Accordingly, no limitation on the invention is intended by way of the foregoing description and accompanying drawings, except as set forth in the appended claims.

What is claimed is:

1. A sun visor extension device for improving and expanding coverage from sunlight for a conventional motor vehicle sun visor, the device comprising:

a first panel adapted to be removably connected to the conventional sun visor;

a second panel connected directly to said first panel, said second panel capable of sliding side to side along said first panel to provide extended protection from sunlight shining through a corner of a vehicle; and a third panel connected to said second panel, said third panel capable of swinging side to side to provide protection from sunlight shining through a side of the vehicle.

2. The sun visor extension device of claim 1 wherein said second panel slides along channel guides formed in said first panel.

3. The sun visor extension device of claim 1 wherein said third panel is connected to said second panel through a ball and socket connection.

* * * * *